(12) United States Patent
Herbers

(10) Patent No.: US 7,013,711 B1
(45) Date of Patent: Mar. 21, 2006

(54) TESTING DEVICE FOR TESTING A DRAINAGE SYSTEM FOR LEAKS

(76) Inventor: Charles R. Herbers, 8993 Macon Rd., Cordova, TN (US) 38018

( * ) Notice: Subject to any disclaimer, the term of this patent is extended or adjusted under 35 U.S.C. 154(b) by 0 days.

(21) Appl. No.: 10/918,834

(22) Filed: Aug. 16, 2004

(51) Int. Cl.
*G01M 3/08* (2006.01)
(52) U.S. Cl. .......................... 73/49.1; 73/49.5; 73/49.8
(58) Field of Classification Search ............... 73/49.1, 73/49.5, 49.6, 49.8; 138/90
See application file for complete search history.

(56) References Cited

U.S. PATENT DOCUMENTS

| | | | | |
|---|---|---|---|---|
| 3,756,072 A | * | 9/1973 | MacMurray | 73/40.5 R |
| 4,061,015 A | * | 12/1977 | Fish | 73/49.5 |
| 4,375,297 A | | 3/1983 | Persson | |
| 4,429,566 A | * | 2/1984 | Armell et al. | 73/40.7 |
| 4,429,568 A | | 2/1984 | Sullivan | |
| 4,542,642 A | | 9/1985 | Tagliarino | |
| 4,763,510 A | * | 8/1988 | Palmer | 73/40.5 R |
| 4,770,029 A | * | 9/1988 | Webber et al. | 73/46 |
| 4,932,241 A | | 6/1990 | Carmody et al. | |
| 5,076,095 A | * | 12/1991 | Erhardt | 73/49.8 |
| 5,390,532 A | * | 2/1995 | Anthony | 73/40.5 R |
| 5,431,184 A | | 7/1995 | Hazelton | |
| 5,438,862 A | * | 8/1995 | Keating et al. | 73/49.2 |
| 5,440,918 A | * | 8/1995 | Oster | 73/40.5 R |
| 5,461,905 A | * | 10/1995 | Penisson | 73/46 |
| 5,548,993 A | * | 8/1996 | Alexander | 73/49.5 |
| 5,649,597 A | | 7/1997 | Ringgenberg | |
| 5,665,903 A | | 9/1997 | Moran | |
| 5,740,830 A | | 4/1998 | Mankins | |
| 5,850,037 A | * | 12/1998 | Mullins | 73/40.5 R |
| 5,898,105 A | * | 4/1999 | Owens | 73/49.8 |
| 5,983,706 A | * | 11/1999 | Marks et al. | 73/37 |
| 6,267,001 B1 | * | 7/2001 | Duncan | 73/49.8 |
| 6,378,356 B1 | * | 4/2002 | Ruiz et al. | 73/37 |
| 6,390,118 B1 | * | 5/2002 | Mankins | 137/318 |
| 6,588,454 B1 | * | 7/2003 | Johnson et al. | 138/90 |
| 6,612,618 B1 | * | 9/2003 | Giordano | 285/12 |
| 6,691,556 B1 | * | 2/2004 | Wheeler et al. | 73/40.5 R |
| 6,840,090 B1 | * | 1/2005 | Smith | 73/49.8 |
| 6,915,819 B1 | * | 7/2005 | Duncan | 138/90 |
| 2004/0020269 A1 | * | 2/2004 | Brewer | 73/49.1 |
| 2004/0055364 A1 | * | 3/2004 | Brewer | 73/40.5 R |

* cited by examiner

*Primary Examiner*—Hezron Williams
*Assistant Examiner*—John Fitzgerald
(74) *Attorney, Agent, or Firm*—John D. Gugliotta; P. Jeff Martin

(57) ABSTRACT

An improved testing device for testing a drainage or plumbing system for vertical piping is provided which allows the tester to determine which particular floor is being currently checked for leaks at any time during the test. The testing device includes a tee disposed in fluid tight series communication between a drainage system and drain. A controller means is included which utilizes a ball valve to prevent water spillage during removal of the testing device when testing the drainage system for leaks. A ball valve actuator facilitates actuation of the ball valve. A closure plug assembly is provided which includes multiple ports adapted to accommodate a valve stem of the controller means and a fillgauge apparatus. A fluid elevation gauge provides tester with a visual readout of water elevational levels. A lightweight container is provided to store the testing device to facilitate transportability.

20 Claims, 5 Drawing Sheets

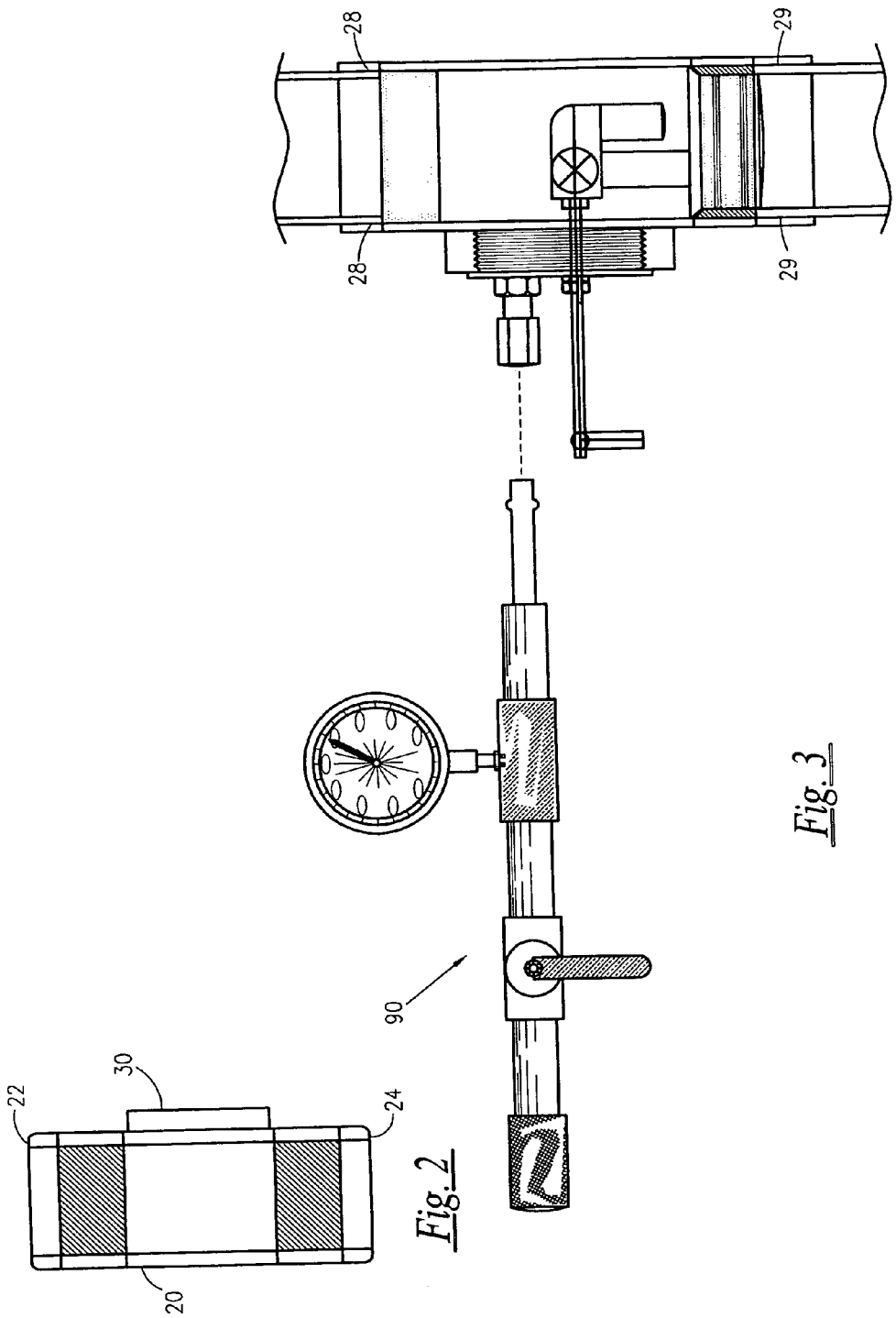

TESTING DEVICE FOR TESTING A DRAINAGE SYSTEM FOR LEAKS

RELATED APPLICATIONS

There are no previously filed, nor currently any co-pending applications, anywhere in the world.

BACKGROUND OF THE INVENTION

1. Field of the Invention

The present invention relates generally to devices for testing leaks in drainage systems and, more particularly, to an improved testing device for testing a drainage or plumbing system for vertical piping.

2. Description of the Related Art

During the construction of single and multi-story buildings, such as office complexes or multi-story residential condominium-like structures, drainage stacks are interconnected in order that water and sewage flows from various floors of the building down standpipe drains to drainage systems. Before completion of the building, plumbing codes require that a pressure test be run on installed plumbing lines to inspect for leaks.

The prior art devices of the class under consideration are characterized by several deficiencies, chiefly among these being the requirement of pumps, transportation of hosing up and down floors, interruption of the test when fixing a leak on an upper level floor, wet flooring from test ball-blow out at testing location, and unnecessary difficulty in installing and removing prior art test devices.

Additionally, the prior art testing devices have failed to address the need for enabling a plumber to determine the particular elevation or floor at which water level is being measured during a testing sequence.

Accordingly, a need has arisen for an apparatus and system for testing a drainage or plumbing system for leaks in multi-story buildings which allows the tester to determine which particular floor is being currently checked for leaks at any time during the test in a manner which is quick, easy, and efficient. The development of the improved testing device for testing a drainage system for leaks fulfills this need.

A search of the prior art did not disclose any patents that read directly on the claims of the instant invention; however, the following references were considered related.

The following patents disclose a closure plug assembly for pressure testing plumbing systems.

U.S. Pat. No. 4,542,642 issued in the name of Tagliarino and U.S. Pat. No. 4,429,568 issued in the name of Sullivan.

U.S. Pat. No. 5,740,830 issued in the name of Mankins describes a method and apparatus for the testing of plumbing installation.

U.S. Pat. No. 5,665,903 issued in the name of Moran discloses a technique for testing pipe couplings for defects.

U.S. Pat. No. 5,649,597 issued in the name of Ringgenberg describes a differential pressure test/bypass valve and method for using.

U.S. Pat. No. 5,431,184 issued in the name of Hazelton discloses a standard on/off natural gas safety valve with the ability to quickly insert a test gauge.

U.S. Pat. No. 4,932,241 issued in the name of Carmody et al. describes a reusable plumbing test pipe.

U.S. Pat. No. 4,375,297 issued in the name of Persson discloses a quick coupling device to a threaded pipe nipple.

Consequently, a need has arisen for an apparatus and system for testing a drainage or plumbing system for leaks in multi-story buildings which provides the user with a visual read out of water elevation levels manner which is quick, easy, and efficient.

SUMMARY OF THE INVENTION

Therefore, it is an object of the present invention to provide an improved testing device for testing a drainage or plumbing system for leaks in multi-story buildings.

It is another object of the present invention to provide a testing device which provides the tester with full control at test point.

It is another object of the present invention to provide a testing device which provides water on demand.

It is another object of the present invention to provide a testing device which allows for controlled drainage.

It is another object of the present invention to provide a fluid elevation gauge adapted to provide tester with a visual readout of water elevational levels.

It is another object of the present invention to provide a testing device which doesn't require pumps.

It is another object of the present invention to provide a testing device which allows for a far greater testing range.

It is still another object of the present invention to provide a durable testing device.

It is yet another object of the present invention to provide a testing device which is labor efficient.

It is another object of the present invention to provide a testing device which is safer and cleaner than conventional drainage-leak testing devices.

Briefly described according to one embodiment of the present invention, an improved testing device for testing a drainage system for leaks is adapted for testing a drainage or plumbing system for leaks in multi-story buildings. The testing device is comprised of an elongated, tubular member, or tee disposed in fluid tight series communication between a drainage system and drain. The tubular member defines an annular ledge disposed inside tubular member, and is angularly oriented so as to form a seat. The tubular member further defines a circular inlet which is disposed longitudinally, and projects outwardly away from annular ledge. The inlet provides access to the annular ledge. A closure means is provided for placement within the inlet to seal the tubular member for usage of the drainage system.

A controller means is disclosed having a bushing which defines an upper annular ledge being angularly oriented so as to form an annular seat adapted to cooperate snugly with the corresponding seat of annular ledge of tubular member. A plurality of rubber O-ring gaskets are disposed about an external circumferential surface of the bushing to facilitate sealable engagement by bushing with seat of annular ledge of tubular member. The controller means further comprises an elongated, tubular drainage nipple mounted vertically in fluid tight communication to bushing. Connected in fluid tight communication atop drainage nipple resides a 90° ell. The 90° ell functions as a ball valve which allows water to drop below the inlet of tubular member so as to prevent water spillage during the removal of the testing device for testing drainage system for leaks.

In order to facilitate actuation of ball valve, a ball valve actuator is provided. The ball valve actuator is defined as an elongated valve stem having a first end suitably coupled to ball valve via a crankshaft. The valve stem is operatively coupled to ball valve in a manner adapted to facilitate controlled actuation of ball valve.

A snap-on handle is adapted to be removably fastened to a second end of valve stem. A ¼ clockwise turn of handle actuates ball valve to an on position, and a ¼ counterclockwise turn of handle, leaving handle in a downward position, actuates drainage. Drainage is accomplished via a siphon tube of 90° ell.

A closure plug assembly is disclosed and comprises a bushing plug defining an annular top having a peripheral edge which extends outward peripherally so as to form an annular recess. The bushing plug is lined with male threads peripheral to facilitate threaded coupling to inlet. A rubber O-ring gasket is disposed about an external circumferential surface of bushing plug below annular recess. The rubber O-ring gasket facilitates sealable engagement by bushing plug with inlet.

The bushing plug further comprises dual ports, wherein a valve stem receiving port is adapted to receive in fluid tight communication the valve stem of controller means. A fillgauge receiving port is adapted to receive in fluid tight communication a male quick-connect coupler of a fillgauge apparatus.

The fillgauge apparatus comprises an elongated tubular member having an anterior end opposing a posterior end. The anterior end defines the male quick-connect coupler for insertable engagement within fillgauge receiving port.

A port opens through an external circumferential sidewall of a top end portion of elongated tubular member below the male quick-connect coupler. The port is surrounded by a smaller diameter female boss allowing for a fluid tight threaded connection to a fluid elevation gauge. The posterior end of elongated tubular member is suitably connected with a hose adapter adapted to facilitate fluid tight connection by a conventional hose for filling tubular member during testing. A fillgauge ball valve is adapted for fluid tight axial connection within elongated tubular member, between fluid elevation gauge and hose adapter. Actuation of fillgauge ball valve is controlled by a handle suitably mounted thereto. The fluid elevation gauge is adapted to provide a visual readout of water elevational levels.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 2 is a right side elevational view of the tubular member, according to the preferred embodiment of the present invention;

FIG. 3 is an exploded perspective view of the present invention illustrating insertion of the fillgauge apparatus into the fillgauge receiving port, according to the preferred embodiment;

DESCRIPTION OF THE PREFERRED EMBODIMENT

1. Detailed Description of the Figures

Figure 1:
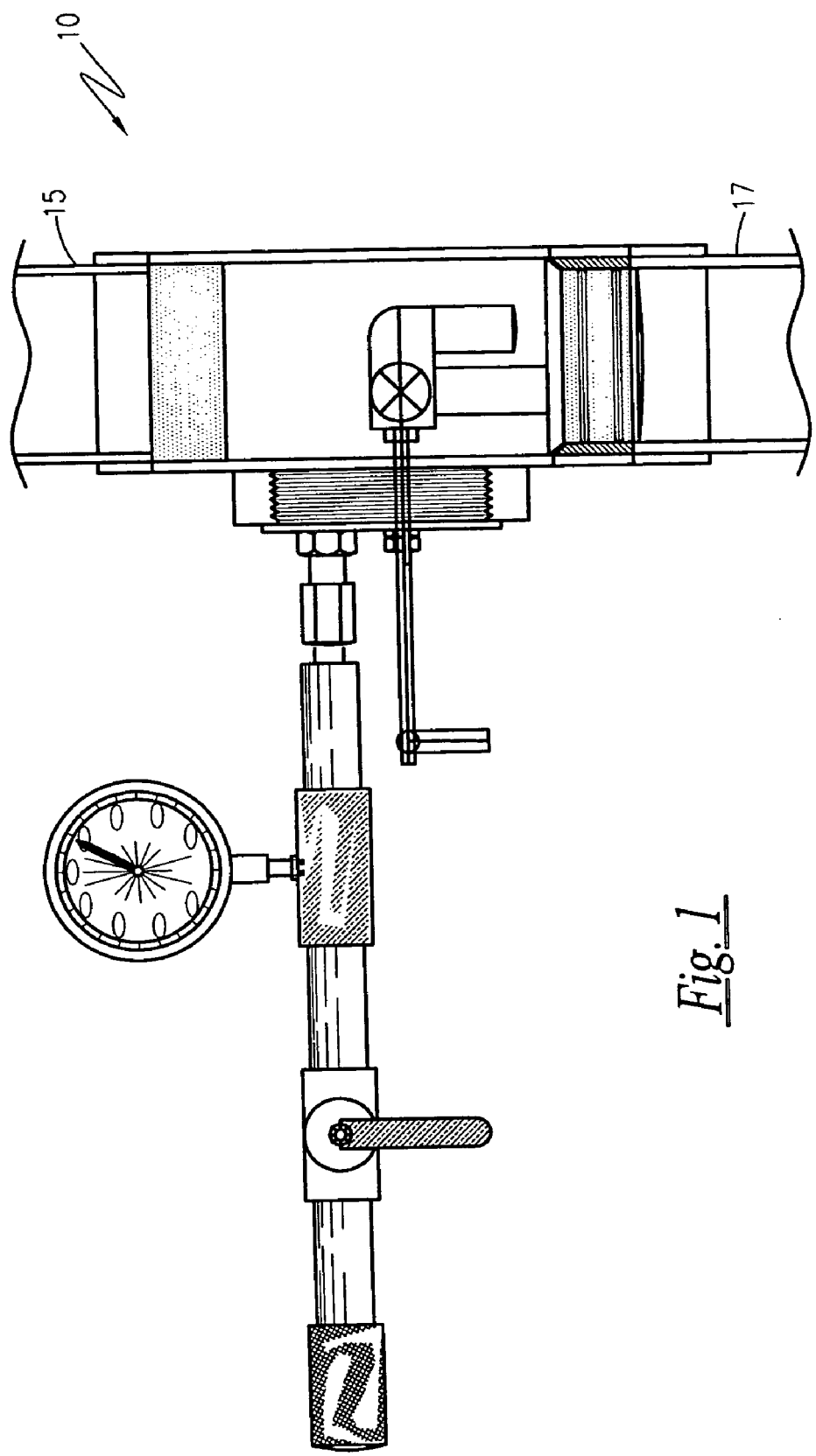
FIG. 1 is a perspective view of an improved testing device for testing a drainage system for leaks, according to the preferred embodiment of the present invention.
Figure 4:
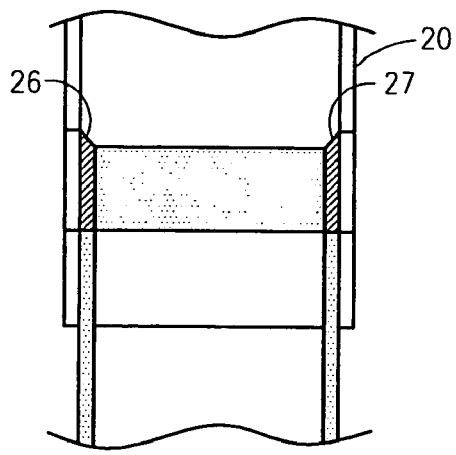
FIG. 4 is a cross-sectional view of tubular member illustrating the annular ledge, according to the preferred embodiment of the present invention.
Figure 5:
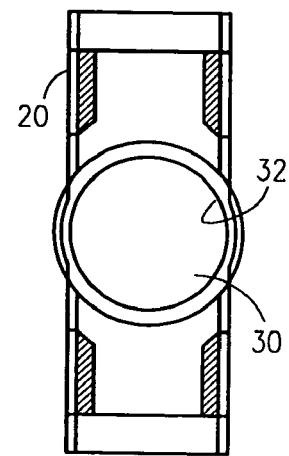
FIG. 5 is a front side elevational view of the tubular member illustrating the inlet.
Figure 6:
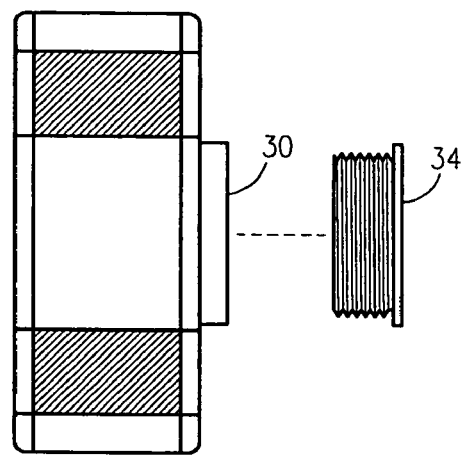
FIG. 6 is an exploded perspective view of present invention showing coupling of the end cap to inlet, according to the preferred embodiment.

Referring now to FIGS. 1–6, an improved testing device for testing a drainage system for leaks 10 is shown, hereinafter testing device 10, according to the present invention, adapted for testing a drainage or plumbing system for leaks in multi-story buildings. The testing device 10 is comprised of an elongated, tubular member 20 having an upper end 22 opposing a lower end 24. The tubular member 20 is disposed in fluid tight series communication between a drainage system 15 and drain 17. The upper end and lower end 24 of tubular member 20 define sockets 28 and 29, respectively for receiving an end of the drainage system 15 and an end of the drain 17, respectively. Once disposed in a desired location, the tubular member 20 is adapted to remain in position as a clean out. The tubular member 20 defines an annular ledge 26 disposed between the upper end 22 and lower end 24 of tubular member 20. The annular ledge 26 is angularly oriented or inclined at an angle measuring approximately 45°, thereby forming a seat 27, the function of which to be described in greater detail below.

The tubular member 20 further defines a circular inlet 30 which is disposed longitudinally, and projects outwardly away from annular ledge 26. The inlet 30 provides access to the annular ledge 26. The inlet 30 forms an opening lined with female receiving threads 32. The inlet 30 has a diametric measure being greater by one incremental measure than a diametric measure of tubular member 20. For example, tubular member 20 is envisioned as having a diameter measuring approximately 3 inches, thus inlet 30 would have a corresponding diameter measuring approximately 4 inches.

A closure means or end cap 34 is provided for placement within the inlet 30 to seal the tubular member 20 for usage of the drainage system 15. The end cap 34 is lined with male threads to facilitate threaded coupling to inlet 30.

Figure 7:
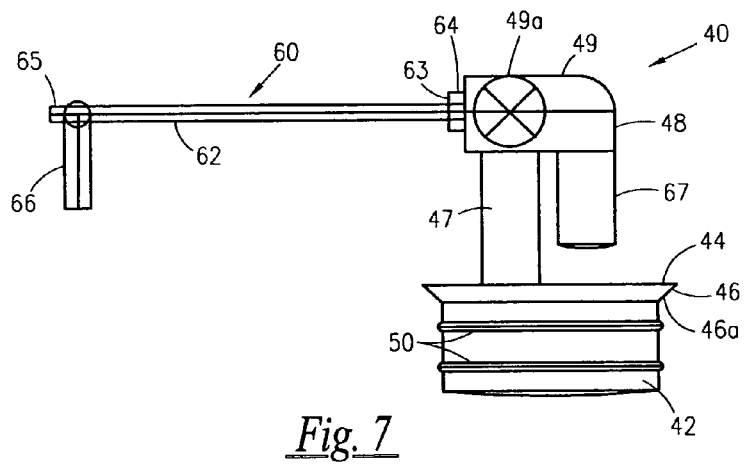
FIG. 7 is a side elevational view of the controller means, according to the preferred embodiment of the present invention.
Figure 8:
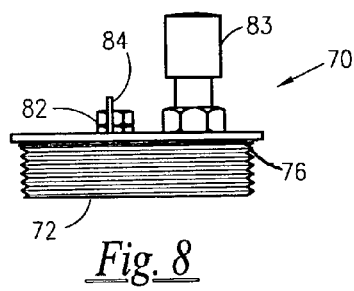
FIGS. 8 & 9 are side elevational views of the closure plug assembly, according to the preferred embodiment of the present invention.
Figure 9:
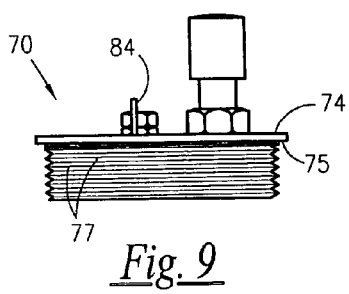
Figure 10:
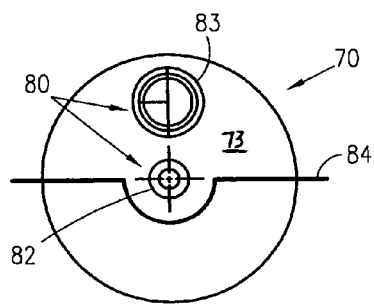
FIG. 10 is a top planar view of the closure plug assembly, according to the preferred embodiment of the present invention.

Referring now to FIGS. 1, 3, and 7, a controller means 40 is provided. The controller means 40 comprises a bushing 42 having an upper annular ledge 44 being angularly oriented or declined at an acute angle measuring less than 45°, thereby forming an annular seat 46 having a contact surface 46a adapted to cooperate snugly with the corresponding seat 27 of annular ledge 26.

A plurality of rubber O-ring gaskets 50 are disposed about an external circumferential surface of bushing 42 in a spaced orientation, below upper annular ledge 44. The O-ring gaskets 50 facilitate sealable engagement by bushing 42 with seat 27 of annular ledge 26.

The controller means 40 further comprises an elongated, tubular drainage nipple 47 mounted vertically in fluid tight communication to bushing 42. Connected in fluid tight communication atop drainage nipple 47 resides a 90° ell 48.

The 90° ell 48 functions as a ball valve 49 which allows water to drop below the inlet 30 of tubular member 20 so as to prevent water spillage during the removal of the testing device 10 for testing drainage system 15 for leaks.

In order to facilitate reciprocation of ball 49a within ball valve 49, a ball valve actuator 60 is provided. The ball valve actuator 60 is defined as an elongated valve stem 62 having a first end 63 suitably coupled to ball valve 49 via a crankshaft 64. The valve stem 62 is operatively coupled to ball valve 49 in a manner adapted to facilitate controlled actuation of ball valve 49.

A snap-on handle 66 is adapted to be removably fastened to a second end 65 of valve stem 62. A ¼ clockwise turn of handle 66 actuates ball valve 49 to an on position, and a ¼ counterclockwise turn of handle 66, leaving handle 66 in a downward position, actuates drainage. Drainage is accomplished via a siphon tube 67 of 90° ell 48. The siphon tube 67 extends downward from and is in fluid tight communication with ball valve 49, wherein siphon tube 67 is adjacent to drainage nipple 47 and having a shorter length than drainage nipple 47. It is envisioned that various lengths of valve stems 62 may be utilized, including but not limited to valve stems 62 measuring approximately 3 to 10 inches in length.

Referring now to FIGS. 1, 3, 8–10, a closure plug assembly 70 is provided. The closure plug assembly 70 comprises a bushing plug 72 defining an annular top 73 having a peripheral edge 74 which extends outward peripherally so as to form an annular recess 75. The bushing plug 72 is lined with male threads 77 below peripheral edge 74 to facilitate threaded coupling to inlet 30. A rubber O-ring gasket 76 is disposed about an external circumferential surface of bushing plug 72 below annular recess 75. The rubber O-ring gasket 76 facilitates sealable engagement by bushing plug 72 with inlet 30.

The bushing plug 72 comprises dual ports 80, the function of which to be described hereinbelow. A valve stem receiving port 82 is adapted to receive in fluid tight communication the valve stem 62 of controller means 40. More specifically, the second end 65 of valve stem 62 (without snap-on handle 66) is inserted through valve stem receiving port 82. The bushing plug 72 is threadedly coupled to inlet 30 via the aid of a handle 84 mounted transversely atop annular top 73 of bushing plug 72. The handle 84 allows for quick, easy, and efficient coupling of the bushing plug 72 to the inlet 30 in a snug manner which eliminates the need for additional tools. A fillgauge receiving port 83 is adapted to receive in fluid tight communication a male quick-connect coupler 92 of a fillgauge apparatus 90 (to be describe in greater detail below). It is envisioned that bushing plug 72 may comprise additional ports to provide for the employment of various other functions. For example, a third port may be provided and adapted to accommodate a constant water pressure reading gauge.

Figure 11:
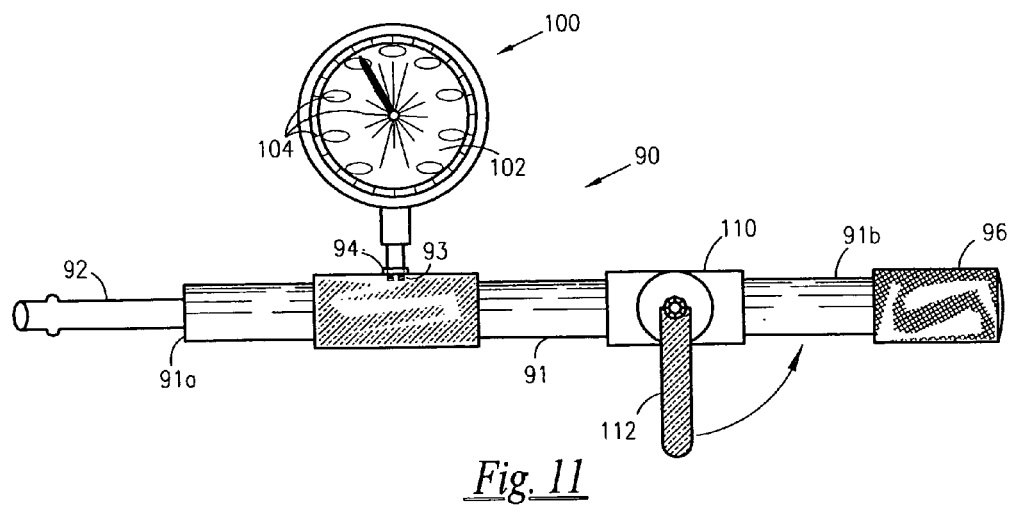
FIG. 11 is side elevational view of the fillgauge apparatus, according to the preferred embodiment of the present invention.

Referring now to FIGS. 1, 3, and 11, the fillgauge apparatus 90 is illustrated. The fillgauge apparatus 90 comprises an elongated tubular member 91 having an anterior end 91a opposing a posterior end 91b. The anterior end 91a defines a male quick-connect coupler 92 for insertable engagement within fillgauge receiving port 83, as described above.

A port 93 opens through an external circumferential sidewall of a top end portion of tubular member 91 below the male quick-connect coupler 92. The port 93 is surrounded by a smaller diameter female boss 94 allowing for a fluid tight threaded connection to a fluid elevation gauge 100 (to be described in greater detail below). The posterior end 91b of tubular member 91 is suitably connected with a hose adapter 96 adapted to facilitate fluid tight connection by a conventional hose for filling tubular member 20 during testing. A fillgauge ball valve 110 is adapted for fluid tight axial connection within tubular member 91, between fluid elevation gauge 100 and hose adapter 96. Actuation of fillgauge ball valve 110 is controlled by a handle 112, suitably mounted thereto. Forward and reverse rotation of the handle 112 operates to open and close fillgauge ball valve 110, thereby allowing water from a conventional hose to flow through the fillgauge apparatus 90 in a pressurized manner, and to be arrested from flowing therethrough, respectively.

The fluid elevation gauge 100 is adapted to provide a visual readout of water elevational levels. The fluid elevation gauge 100 is configured to read both pounds of water pressure and elevation based upon residual head pressure. For purposes of this disclosure, and not by way of limitation, the gauge 100 is adapted to convert every 5 pounds of water pressure to an elevation of 10 feet. Thus, considering standard height of office complex floors being 10 feet, upon a reading of 10 pounds of pressure, the gauge 100 will display $2^{nd}$ FL (floor) or 20 feet. The gauge 100 is adapted to provide indicia 104 delineating pounds of pressure and floor elevation on a face 102 of gauge 100. The fluid elevation gauge 100 provides the tester with a quick, easy, and efficient manner to determine which particular floor is being currently checked for leaks.

Figure 12:
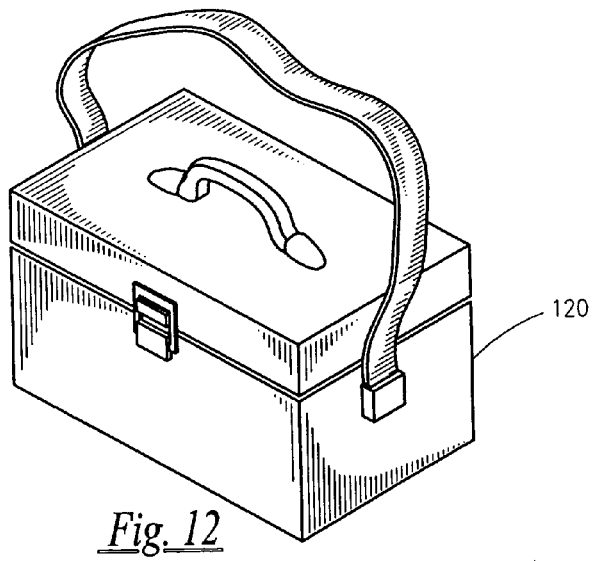
FIG. 12 is a perspective view of a portable container for storing the testing device.

Finally, referring to FIG. 12, it is envisioned that a portable, lightweight, container 120 is adapted to store the testing device 10 (not including the tubular member 20 or end cap 34) to facilitate transportability. The tubular member 20 or end cap 34 are not anticipated as being stored within container 120, because once installed, the tubular member 20 is adapted to remain in position as a clean out and the end cap 34 allows for normal usage of the drainage system 15. The container 120 may be adapted with a carrying handle and/or strap.

2. Operation of the Preferred Embodiment

To use the present invention, user removes end cap 34, and inserts controller means 40 through inlet 30, whereupon the annular seat 46 of bushing 42 of controller means 40 cooperatively engages the corresponding seat 27 of annular ledge 26 of tubular member 20 in a snug manner. User next inserts the second end 65 of valve stem 62 (without snap-on handle 66) through the valve stem receiving port 82 of closure plug assembly 70, and threadedly couples bushing plug to inlet 30 via the aid of handle 84. User then snaps handle 66 on valve stem 62. Next, user connects the male quick-connect coupler 92 of a fillgauge apparatus 90 to the fillgauge receiving port 83. User then connects a conventional hose to the hose adapter 96 of fillgauge apparatus 90. Next, user makes a ¼ clockwise turn of the snap-on handle 66 to actuate ball valve 49, and rotates the handle 112 of fillgauge apparatus 90 in a forward direction to open the fillgauge ball valve 110, thereby allowing water from the hose to flow through the fillgauge apparatus 90 in a pressurized manner, and ultimately flow to tubular member 20. Finally, when completing the test for leaks, user repeats the aforementioned steps in reverse sequential order.

The use of the present invention provides an apparatus and system for testing a drainage or plumbing system for leaks in multi-story buildings which provides the user with a visual read out of water elevation levels in a manner which is quick, easy, and efficient.

Therefore, the foregoing description is included to illustrate the operation of the preferred embodiment and is not meant to limit the scope of the invention. As one can envision, an individual skilled in the relevant art, in conjunction with the present teachings, would be capable of incorporating many minor modifications that are anticipated within this disclosure. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents. Therefore, the scope of the invention is to be broadly limited only by the following claims.

What is claimed is:

1. A testing device for testing a drainage system for leaks comprising:
    a tubular member, said tubular member is of an elongated configuration having an upper end opposing a lower end, said tubular member is disposed in fluid tight series communication between a drainage system and a drain, wherein said tubular member defines an annular ledge disposed between said upper end and said lower end of said tubular member, said annular ledge is angularly oriented so as to form a seat, and wherein said tubular member defines a circular inlet disposed longitudinally, and projects outwardly from said annular ledge;
    a controller means, said controller means comprises a bushing adapted to cooperate snugly with said seat of said annular ledge of said tubular member;
    a ball valve actuator, said ball valve actuator defines an elongated valve stem being suitably coupled to said controller means;
    a closure plug assembly, said closure plug assembly comprises a bushing plug lined with male threads to facilitate threaded coupling to said circular inlet; and
    a fillgauge apparatus, said fillgauge apparatus is adapted for insertable engagement within said bushing plug.

2. The testing device for testing a drainage system for leaks of claim 1, wherein said upper end and said lower end of said tubular member define a socket for receiving an end of the drainage system and an end of the drain, respectively.

3. The testing device for testing a drainage system for leaks of claim 1, wherein said circular inlet forms an opening lined with female receiving threads, said circular inlet has a diametric measure being greater by one incremental measure than a diametric measure of said tubular member, and wherein said circular inlet threadedly receives a closure means in order to seal said tubular member for usage of the drainage system.

4. The testing device for testing a drainage system for leaks of claim 1, wherein said bushing of said controller means has an upper annular ledge being angularly oriented so as to form an annular seat having a contact surface adapted to cooperate snugly with said seat of said annular ledge of said tubular member.

5. The testing device for testing a drainage system for leaks of claim 1, wherein said bushing of said controller means includes a plurality of rubber O-ring gaskets disposed about an external circumferential surface of said bushing in a spaced orientation, below said upper annular ledge, said plurality of rubber O-ring gaskets facilitate sealable engagement by said bushing with said seat of said annular ledge of said tubular member.

6. The testing device for testing a drainage system for leaks of claim 1, wherein said controller means further comprises a tubular drainage nipple of an elongated configuration, said tubular drainage nipple is mounted vertically in fluid tight communication to said bushing of said controller means.

7. The testing device for testing a drainage system for leaks of claim 6, wherein said controller means further comprises a 90° ell connected in fluid tight communication atop said tubular drainage nipple, said 90° ell functions as a ball valve which allows water to drop below said circular inlet of said tubular member so as to prevent water spillage during removal of the testing device for testing the drainage system for leaks.

8. The testing device for testing a drainage system for leaks of claim 1, wherein said elongated valve stem has a first end opposite a second end, wherein said first end is suitably coupled to said 90° ell via a crankshaft, said elongated valve stem is operatively coupled to said 90° ell in a manner adapted to facilitate controlled actuation of 90° ell as a ball valve.

9. The testing device for testing a drainage system for leaks of claim 8, wherein said 90° ell includes a siphon tube to facilitate drainage, said siphon tube extends downward from and is in fluid tight communication with said 90° ell, said siphon tube is adjacent to said drainage nipple, and said siphon tube has a shorter length than said drainage nipple.

10. The testing device for testing a drainage system for leaks of claim 8, wherein said second end of said elongated valve stem is removably fastened with a snap-on handle, said snap-on handle is adapted to rotate clockwise and counterclockwise, thereby actuating closure and drainage, respectively of said 90° ell.

11. The testing device for testing a drainage system for leaks of claim 1, wherein said bushing plug of said closure plug assembly defines an annular top having a peripheral edge which extends outward peripherally so as to form an annular recess, said male threads of said bushing plug are lined below said peripheral edge to facilitate threaded coupling to said circular inlet of said tubular member, and wherein said bushing plug has a rubber O-ring gasket disposed about an external circumferential surface thereof, below said annular recess, wherein said rubber O-ring gasket facilitates sealable engagement by said bushing plug with said circular inlet.

12. The testing device for testing a drainage system for leaks of claim 11, wherein said bushing plug comprises multiple ports.

13. The testing device for testing a drainage system for leaks of claim 12, wherein said multiple ports comprise:
    a valve stem receiving port, said valve stem receiving port is adapted to insertably receive in fluid tight communication said second end of said valve stem of said controller means; and
    a fillgauge receiving port, said fillgauge receiving port is adapted to insertably receive in fluid tight communication a male quick-connect coupler of a fillgauge apparatus.

14. The testing device for testing a drainage system for leaks of claim 11, wherein said bushing plug is threadedly coupled to said circular inlet via a handle, said handle is mounted transversely atop said annular top of said bushing plug, said handle facilitates quick, easy, and efficient coupling of said bushing plug to said circular inlet in a snug manner which eliminates a need for additional tools.

15. The testing device for testing a drainage system for leaks of claim 1, wherein said fillgauge apparatus comprises an elongated tubular member having an anterior end opposing a posterior end, said anterior end defines a male quick-connect coupler for insertable engagement within said fillgauge receiving port.

16. The testing device for testing a drainage system for leaks of claim 15, wherein said tubular member includes a port which opens through an external circumferential sidewall of a top end portion of said tubular member below said male quick-connect coupler, said port is surrounded by a smaller diameter female boss allowing for a fluid tight threaded connection to a fluid elevation gauge, wherein said posterior end of said tubular member is suitably connected with a hose adapter adapted to facilitate fluid tight connection by a hose.

17. The testing device for testing a drainage system for leaks of claim 16, wherein said tubular member includes a fillgauge ball valve adapted for fluid tight axial connection within said tubular member, between said fluid elevation gauge and said hose adapter, wherein said fillgauge ball valve is actuated by manual rotation of a handle being suitably mounted thereto, whereupon forward and reverse rotation of said handle operates to open and close said fillgauge ball valve, thereby allowing water from the hose to flow through said fillgauge apparatus in a pressurized manner, and to be arrested from flowing therethrough, respectively.

18. The testing device for testing a drainage system for leaks of claim 16, wherein said fluid elevation gauge is adapted to provide a visual readout of water elevational levels, said fluid elevation gauge is configured to read both pounds of water pressure and elevation based upon residual head pressure, said fluid elevation gauge is adapted to convert every five pounds of water pressure to an elevation of ten feet, wherein said fluid elevation gauge is further adapted to provide indicia delineating pounds of pressure and floor elevation on a face of said fluid elevation gauge, thereby providing a tester with a quick, easy, and efficient manner to determine which particular floor is being currently checked for leaks.

19. The testing device for testing a drainage system for leaks of claim 1, further comprising a portable, lightweight, container adapted to store the testing device to facilitate transportability.

20. The testing device for testing a drainage system for leaks of claim 19, wherein said container includes a carrying handle and strap.

* * * * *